Nov. 30, 1971   E. M. MARSHALL   3,623,422
FOOD COOKING GRILL

Filed Oct. 2, 1970   3 Sheets-Sheet 1

INVENTOR.
EDWARD M. MARSHALL
BY
Lloyd J. Andres

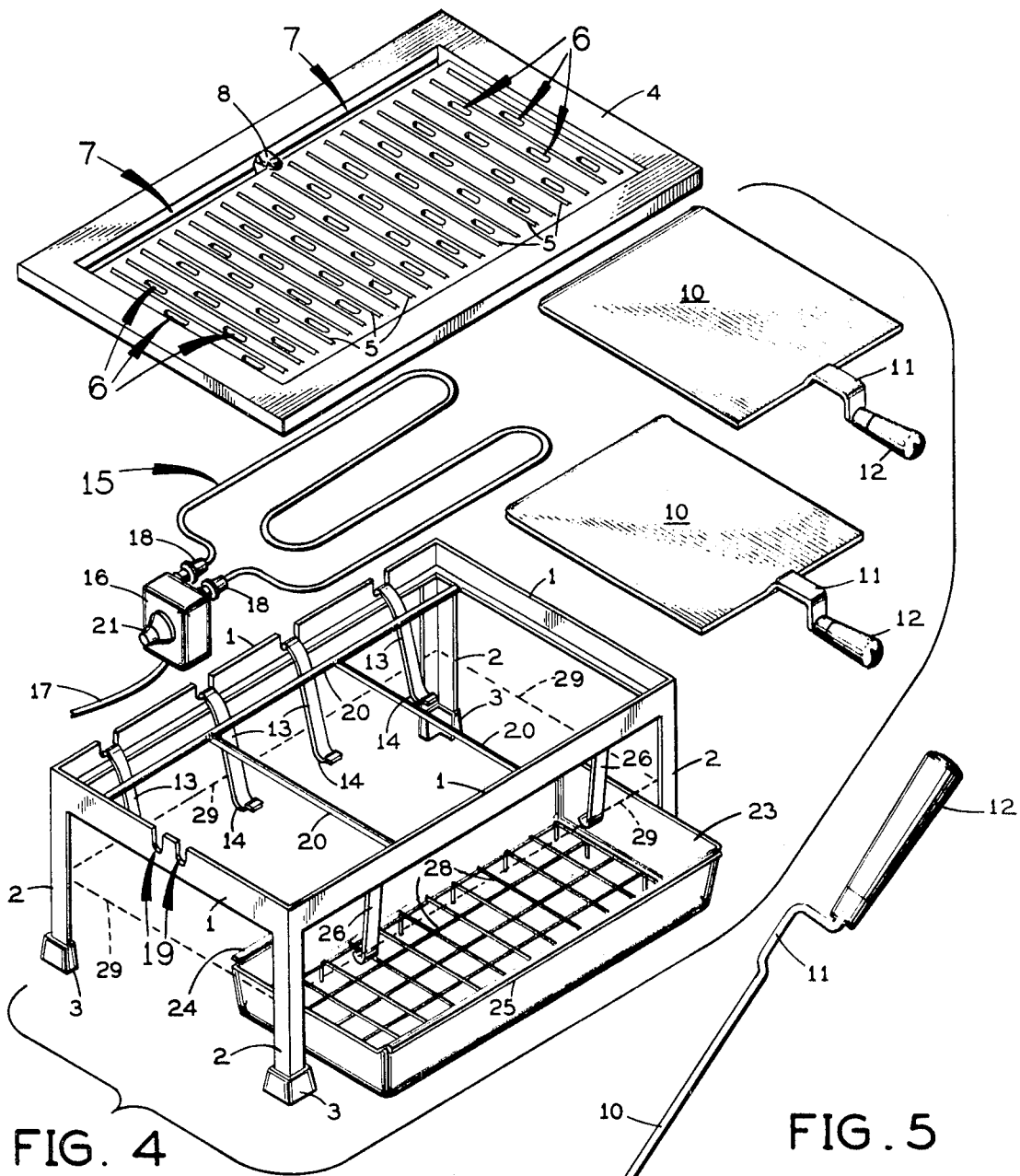
FIG. 4
FIG. 5
INVENTOR.
EDWARD M. MARSHALL
BY
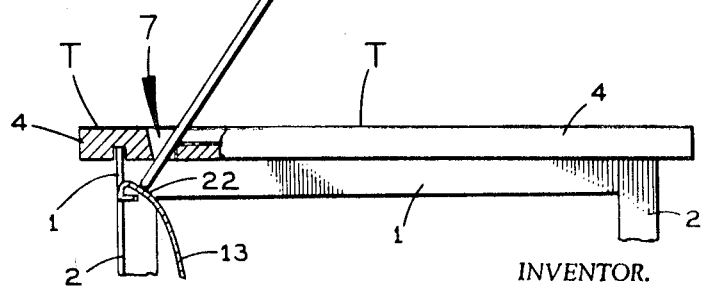

United States Patent Office 3,623,422
Patented Nov. 30, 1971

3,623,422
FOOD COOKING GRILL
Edward M. Marshall, 8107 SW. 72nd Ave., Apt. 102E, Miami, Fla. 33143
Filed Oct. 2, 1970, Ser. No. 77,548
Int. Cl. A47j 37/06
U.S. Cl. 99—400
7 Claims

ABSTRACT OF THE DISCLOSURE

A grill for cooking food simultaneously on the upper and lower sides with a frame suporting a main perforated cooking plate over a detachable electric heat source. One or more manually operated gravity cooking plates for positioning and cooking the upper side of food resting on the main plate. A slot in said main plate for receiving each gravity plate in an angular food removal position and for further movement to gravitate downward to an idle position, including a removable receptacle in said frame for receiving drippings and for retaining an alterenate heat source.

---

This invention relates in general to cooking grills and more particularly to a grill adapted to simultaneously cook food from the upper and lower sides in relatively short time.

Prior grills heated on the under side only and usually required the manual invention of the food cooked thereon, which greatly extends the cooking time. Certain other grills are provided with a pair of heating elements for cooking food therebetween which are costly, relatively inefficient, and require considerable service due to the failure of the electric connections to the movable cooking plate of the grill. Furthermore, present grills tend to release undesirable fumes from burning fats which remain in contact with heated elements.

The present invention overcomes the above objections and disadvantages by the provision of a relatively low cost grill having a main cooking plate supported by gravity on a suitable frame quickly removable for cleaning and is provided with apertures for the descent of melted fat into a receptacle and is also provided with a manually operated gravity plate or plates positioned on the main cooking plate directly heated therefrom, which construction is a principal object of the invention.

Another object of the invention is the provision of a heated gravity plate for positioning on food placed on the main plate including a provision for lifting the gravity plate to a tilted position for the removal of food without appreciable heat loss and a further provision for storing the plate in an idle upright position in the frame at the rear of the main plate for convenient use.

These and other objects and advantages in one embodiment of the invention are described and shown in the following specification and drawings, in which:

FIG. 4 is an exploded perspective view of the grill shown in FIG. 1.

FIG. 5 is a fragmentary view illustrating the food removal position of the gravity plate shown in FIGS. 1–4.

Figure 1:
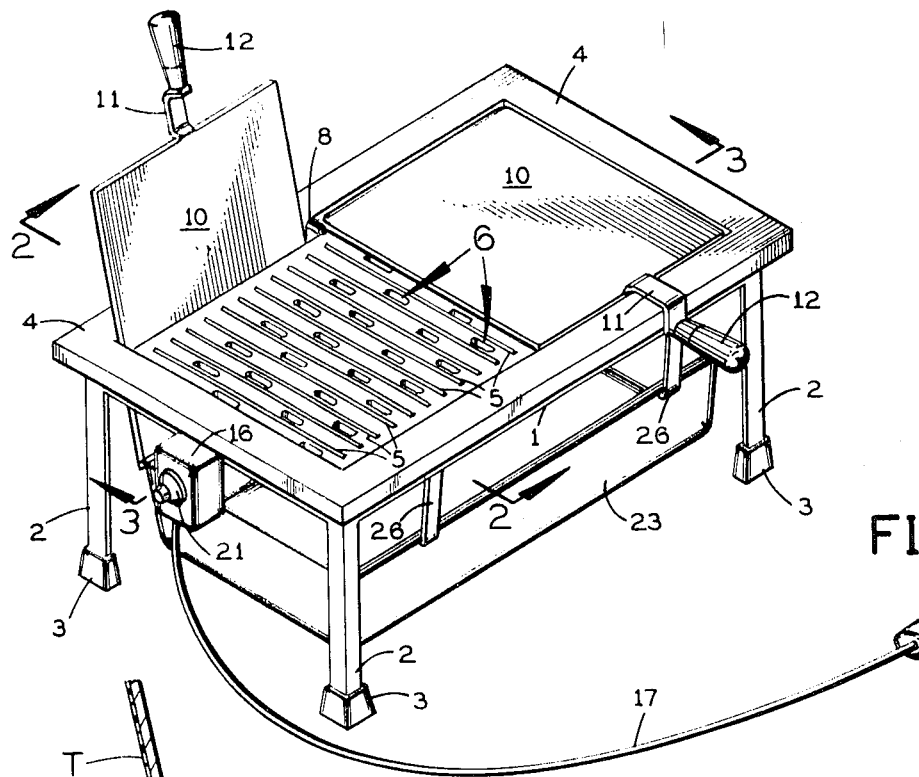
FIG. 1 is a perspective view in reduced scale of a dual operating grill having independent gravity plates for simultaneously cooking the upper side of food being cooked on the main plate.

Referring to FIGS. 1–4, the rectangular frame 1, having an inward extending flange of uniform cross section is integral with four legs 2 which terminate in elastomer feet 3 to prevent dislocation of the grill when resting on a smooth surface. The feet may be readily replaced by angle means for the use of screws for fastening the unit to a bench or table.

The main rectangular cooking plate 4 is preferably a casting of aluminum alloy for rapid heat conduction and has a planar under side with the upper side including a plurality of equi-spaced integral colinear ridges 5 of inverted V cross section and predetermined height.

A pair of elongated apertures 6 are equi-spaced and alternately in displaced position on opposite sides of ridges 5, as shown. A pair of colinear slots 7, of uniform width and shape as shown, extend through the rear margin of the plate 4 separated by an integral bridge 8 having an arcuate upper surface, as shown, and centrally dividing the slots 7—7.

Figure 2:
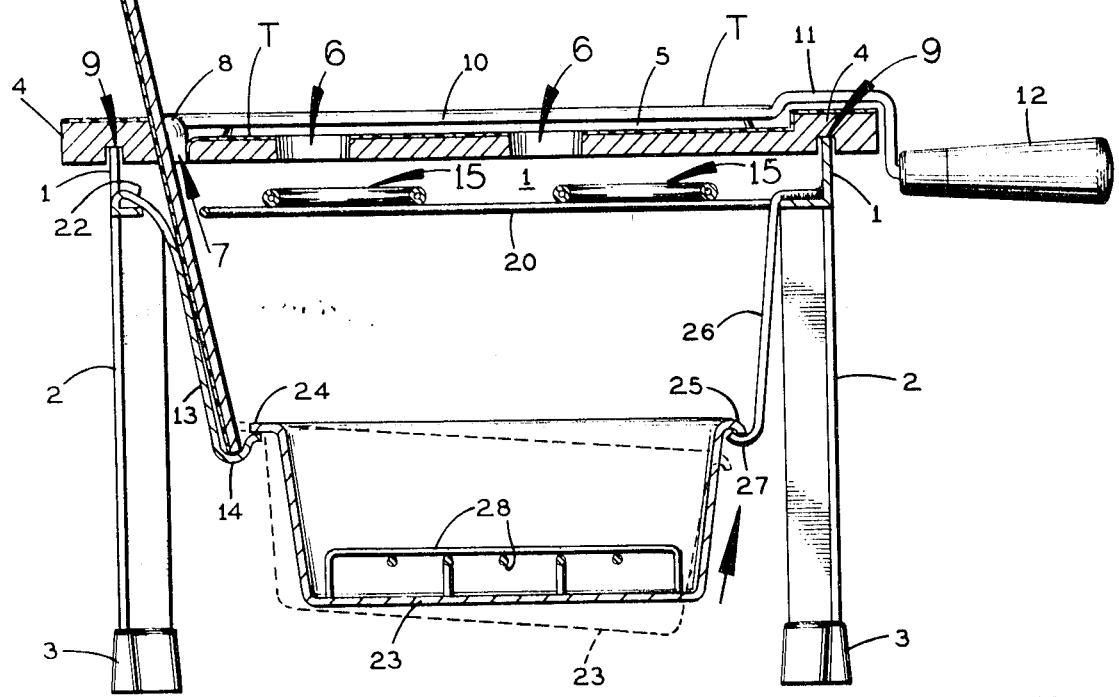
FIG. 2 is an enlarged cross sectional view taken through section line 2—2, FIG. 1.
Figure 3:
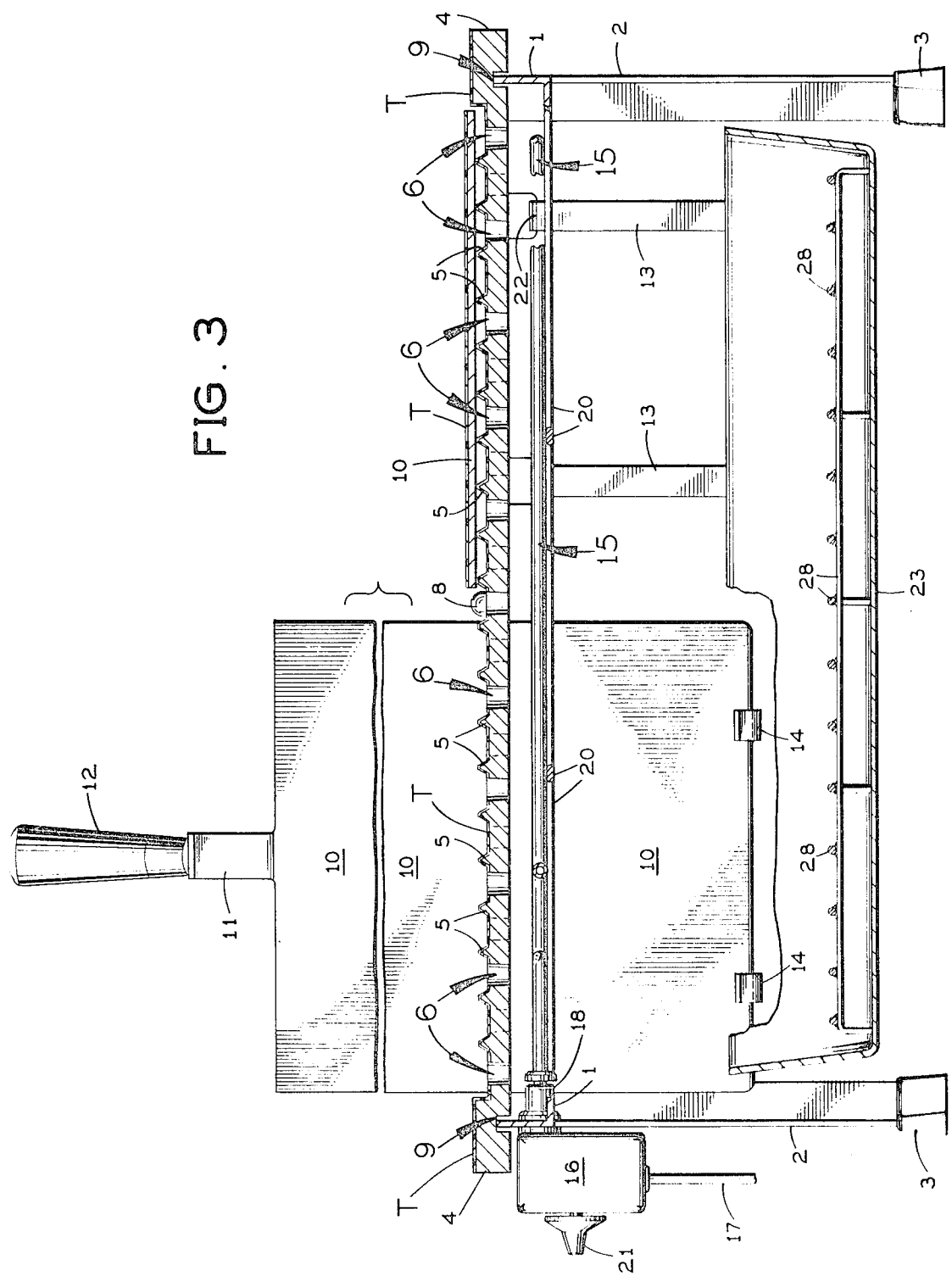
FIG. 3 is an enlarged cross sectional view taken through section line 3—3, FIG. 1.

Referring to FIGS. 2 and 3, the upper edge of the frame 1 is adapted to engage a rectangular marginal slot 9, of uniform width and depth, in the under side of plate 4, for positioning the gravity support of the latter.

Referring to FIG. 1, identical cooking plates 10—10 are preferably made from aluminum alloy of sufficient thickness to provide a necessary predetermined weight and high thermal conductivity. Each plate is provided with an integral neck bracket 11 to which a heat resistant handle 12 is secured, as shown. Each plate is intended to be manually moved from its operative position on the food on the main plate 4 or in heating position on the main cooking grill to its idle position in slot 7, as shown in FIG. 1.

Referring to FIGS. 2 and 4, arms 13 terminate at their lower ends 14 in a hook for engaging and holding the lower edges of each plate 10 when in idle position, as shown in FIG. 1. The upper end of each arcuate arm 13 is either an integral stamping with the rear member of frame 1 or has separate arms 13 welded thereto.

Again referring to FIG. 4, an electric heating element 15, preferably of the Calrod type, is removably connected to an electric junction box 16 from which an electric power cord 17 is connected. The end portions of the heating element which enters box 16 are provided with insulating bushings 18—18 for retention in a pair of U shaped slots 19 in the side of the frame 1. Three rods 20 are secured to each other and the end flanges of the frame 1 by well known welding means for providing the support for the electric element 15 when the bushings 18 are engaged in slots 19. The box 16 may or may not contain an electric thermostat under the control of a knob 21, depending on factors hereinafter described.

FIG. 5 illustrates the position of each top grill plate 10 when retained in position to remove cooked food from plate 4 which position is maintained at the approximate angle shown by the gravitation of the plate 10 with the rear margin thereof bearing against diagonal opposite corners of the slot 7 with the lower edge of the plate 10 resting against the upper sloping portion 22 of each arcuate arm 13. Thus it is apparent that when each plate is moved upward, the lower edge will slide along two corresponding arms and come to rest on the lower ends of the hook with the plate in its idle position. The top plate may be pulled from slot 7 and moved directly over the main grill for heating with the neck resting on the margin of the main grill plate 4.

Referring to FIGS. 1–4, a receptacle or drip pan 23 is provided with a flat flange 24 and a downward arcuate flange 25 along opposite sides thereof.

Referring to FIG. 2, a pair of hangers 26 are secured by well known means to the front portion of the frame 1 and provided with an arcuate partial hook 27 at the lower end thereof, as shown. The drip pan may be removed and installed, as illustrated in dotted lines shown in FIG. 2, by moving the pan to the left, which will disengage the flange 25 from the hooks 27 and permit the pan to be lowered and removed. The same procedure is used to replace the pan in its working position, as shown.

When fuel such as briquettes, charcoal, or other combustible fuel is used for a heat source instead of the electric heater, well known welded wire grid 28 including leg means is placed in spaced relation with the bottom of pan 23 and the fuel placed upon the grid for proper air circulation to promote proper combustion. It is apparent that the electric element 15 and the junction box 16 are removed from the frame by merely raising the plate 4 and disengaging the bushings 18 from the slots 19 and removing the heating element 15 and then replacing the plate 4 in its normal position.

The top surface of the main plate 4 may be coated with Teflon T to facilitate removal of the cooked food. Also, either or both sides of the plate 10 may be coated with Teflon for the same purpose.

An alternate construction provides for a sheet metal enclosure 29 covering the openings between the legs 2 with the lower edges thereof extending coplanar with the top edge of the drip pan 23 for providing proper draft and confining the flame and sparks when briquettes or other fuel is used for heating.

In operation and under the assumption that the heating element 15 is energized by power cord 17 and the thermostat knob adjusted to provide a predetermined temperature to the grill and both gravity plates 10 are in their pre-heat position directly over the main plate and when the grill is at proper operating temperature, each of the plates 10 is tipped upward to the intermediate position shown in FIG. 5 and one unit of food is placed centrally on each half of the main plate. Then each gravity plate is pulled from slot 7 and lowered into contact with the upper side of the food, which will become cooked in a relatively short time by the combined heat supplied by the main plate and the gravity plate. The gravity plate will substantially maintain its cooking temperature supplied by the radiant heat and heated air from around the sides of the food.

When the food is properly braised or cooked, the handle 12 is raised sufficiently high to permit the rear end of the plate to slide through the slot 7 to rest against the sloping sides 22 of the pair of arms 13, and then permitted to come to rest by gravity in transverse pinch contact with the lower and upper edges of the slot 7, which will hold the gravity plate at approximately fifty five degrees from the main cooking plate, as shown in FIG. 5. Then at this point, the process is repeated for subsequent cooking or the handle 12 raised to a substantially vertical position permitting the plate to descend along the arms 13 until the lower end thereof comes to rest at the hooked ends 14 of arms 13, best shown in FIG. 2. It is apparent that the alternate use of both sides of the dual grill shown in FIG. 1 will supply a continuous alternate flow of food in relatviely short time.

As grease-bearing food is cooked, the drippings will flow through the aperture 6 and descend from the lower edges thereof into the drip pan which is supported by lower ends 14 of the arms 13 and the two auxiliary hanggers 26, secured to frame 2, best shown in FIGS. 1 and 2.

It is to be noted that when any one of the plates 10 are in their heating position, as shown in FIG. 1, a wide variety of food, such as pancakes, may be heated or cooked on the upper surface of the plate.

It is obvious from FIG. 4 that the entire grill may be quickly disassembled without tools for cleaning, and it is further to be noted that in the event briquette, or charcoal, or other similar fuel is desired for a heating source, the entire heating element including junction box 16 and the heating element may be quickly removed from its normal position by merely raising the main plate 4 and a grid 28 positioned in the drip pan to supply air to the fuel resting on the upper side of the grid.

It is also to be noted that the grill may be converted for gas fuel by the mere substitution of proper burners in the frame of the grill.

Certain other modifications in the construction are intended to come within the teachings and scope of the above specification.

Having described my invention, I claim:

1. A food cooking grill comprising means forming a frame,
    said frame having a planar rectangular upper edge of uniform width,
    a rectangular main cooking plate with an outer margin on each side adapted and constructed on the said upper edge of said frame against lateral movement,
    the portion of said main plate within said margin having a plurality of rows of spaced apertures of predetermined size therethrough,
    a plurality of upstanding ridges of predetermined height integral with the upper side of said main plate with each of said ridges extending between opposite margins of said main plate and positioned between each row of apertures,
    a planar electric heating element detachably secured in said frame and positioned in predetermined parallel spaced relation with respect to the under side of said main plate,
    at least one manually operated planar gravity cooking plate having a projection extending from the central forward edge thereof and terminating in a handle means,
    said projection shaped to conform with the contour of the forward said margin of said main plate for positioning said gravity plate on said main plate whereby said main plate and said gravity plate will be heated when said heating element is energized and whereby food placed on said ridges of said main plate with said gravity plate manually placed on said food by said handle means will be rapidly cooked from the upper and lower sides thereof and said gravity plate will be maintained in heated condition by the heat radiation from the surface of said main plate and heated air flowing upward through said apertures.

2. The construction recited in claim 1 including an electric junction box removably secured in said frame retaining the end terminals of said electric heating element and an adjustable thermostat means in said box with a control knob projecting therefrom and a power cord entering said box including circuit means connecting said power cord and said circuit means and said terminals for heating said main plate and each said gravity plate when the latter is placed in cooking position.

3. The construction recited in claim 1 including a receptacle support means in opposite sides of said frame adapted and constructed for the gravity retention of a quick-detachable receptacle positioned in predetermined parallel spaced relation with said main cooking plate for catching drippings from food when the latter is cooked.

4. The construction recited in claim 1 including a receptacle support means in opposite sides of said frame adapted and constructed for the gravity retention of a quick-detachable receptacle positioned in predetermined parallel spaced relation with said main cooking plate for retaining fuel for heating said main plate when said fuel is ignited and when said electric heating element is removed from said frame.

5. The construction recited in claim 1 including a grid means positioned in the bottom of said receptacle for supplying air to the underside of combustible fuel resting thereon above said bottom for heating said main plate and said gravity plates when said junction box and said heating elements are removed from said frame.

6. A food cooking grill comprising means forming a frame,
    a rectangular main cooking plate having a substantially planar under side detachably retained on said frame, said main cooking plate having an upper planar marginal surface on each side thereof and a rectangular cooking area recessed a predetermined distance downward from the inner upper edge of said margin, said cooking area of said main plate having a plurality of spaced apertures of predetermined size therethrough, a plurality of upstanding ridges of predetermined height integral with the upper side of said cooking area of said main plate with each of said ridges positioned between said apertures, heating means detachably supported in said frame and positioned a predetermined distance from the under side of said cooking area of said main plate, a pair of like planar rectangular gravity cooking plates of predetermined weight with each one thereof having a central projection extending from the forward edge thereof conformed to the margin of said main plate and terminating in a handle for manually moving each of said plates to a first said heating position with the lower surface of each of said gravity plates resting on one half of each said cooking area of said main plate, a longitudinal slot of predetermined constant width and shape through said main plate and adjacent the inner edge of the rear margin of said main plate for admitting each of said plates from the rear edge thereof, a gravity plate support means secured by the upper end thereof to said frame in predetermined proximity to the under side of said main plate and extending downward within said frame a predetermined distance and terminating in an upturned gravity plate rest whereby the said main plate and said gravity plates are heated to a predetermined temperature by said heating means and whereby each of said plates is raised sufficiently to place food on said main plate under each of said gravity plates and each of the latter lowered independently onto said food and following the predetermined cooking of said food each of said plates is raised and the rear end portion thereof inserted through said groove in contact with the upper end portion of said support means and gravity suspended by opposite contact between diagonal opposite edges of said slot for holding each gravity plate in a predetermined angle over said cooking area for the removal of said food and heat maintenance therein and whereby each of the gravity plates is then raised to a substantially vertical position and permitted to gravitate downward to an upright idle position on said rest.

7. The construction recited in claim 6 whereby selected foods may be cooked from the lower sides thereof by placement on the upper surface of each of said gravity plates when the latter and said main plates are heated by said heating means.

References Cited

UNITED STATES PATENTS

| | | | |
|---|---|---|---|
| 640,030 | 12/1899 | Rietzke | 99—340 X |
| 1,999,515 | 4/1935 | Muenzer. | |
| 2,253,834 | 8/1941 | Volks | 99—446 |
| 2,422,950 | 6/1947 | Cash. | |
| 2,515,521 | 7/1950 | Loffredo. | |
| 3,103,160 | 9/1963 | Forniti et al. | 99—339 |
| 3,263,595 | 8/1966 | Bower | 99—349 |
| 3,356,012 | 12/1967 | Rosen | 99—446 |
| 3,490,359 | 1/1970 | Seitz | 99—400 |

FOREIGN PATENTS

| | | | |
|---|---|---|---|
| 550,218 | 12/1942 | Great Britain | 99—339 |

EDWARD L. ROBERTS, Primary Examiner

A. O. HENDERSON, Assistant Examiner

U.S. Cl. X.R.

99—340